United States Patent [19]

Reymond et al.

[11] 4,063,343

[45] Dec. 20, 1977

[54] METHOD AND TOOL FOR STRIPPING ENDS OF CABLES CONTAINING MULTIPLE CONDUCTORS

[75] Inventors: Jean-Claude Reymond; Luigi d'Auria; Benoît Le Guen; Gilbert Rousseil, all of Paris, France

[73] Assignee: Thomson-CSF, Paris, France

[21] Appl. No.: 767,223

[22] Filed: Feb. 9, 1977

[30] Foreign Application Priority Data

Feb. 13, 1976 France .................... 76.04079

[51] Int. Cl.² .................. B23P 19/02; H02G 1/12
[52] U.S. Cl. ........................... 29/427; 81/9.51
[58] Field of Search ............ 29/427, 762; 81/9.51, 81/9.5

[56] References Cited

U.S. PATENT DOCUMENTS

| 2,743,633 | 5/1956 | Powell ................... 81/9.51 |
| 2,929,285 | 3/1960 | Gulemi ................... 81/9.51 |
| 3,832,767 | 9/1974 | Petree ................... 29/427 |

*Primary Examiner*—Milton S. Mehr
*Attorney, Agent, or Firm*—Cushman, Darby & Cushman

[57] ABSTRACT

A stripping tool for stripping ends of cables containing multiple conductors surrounded by an external protecture sheath, intended in particular for stripping optical fibre bundles. It comprises two gripping devices to clamp the cable in two separate areas by means of an adjustable compression on the sheath surrounding the conductors, a control device to position one of the gripping devices so as to stretch axially the sheath lying between thw two areas, and a cutting device to cut a piece of sheath of the desired stripped length; the distance between the areas and the extent of the stretch are predetermined on the basis of the elasticity of the sheath and the length to be stripped.

5 Claims, 11 Drawing Figures

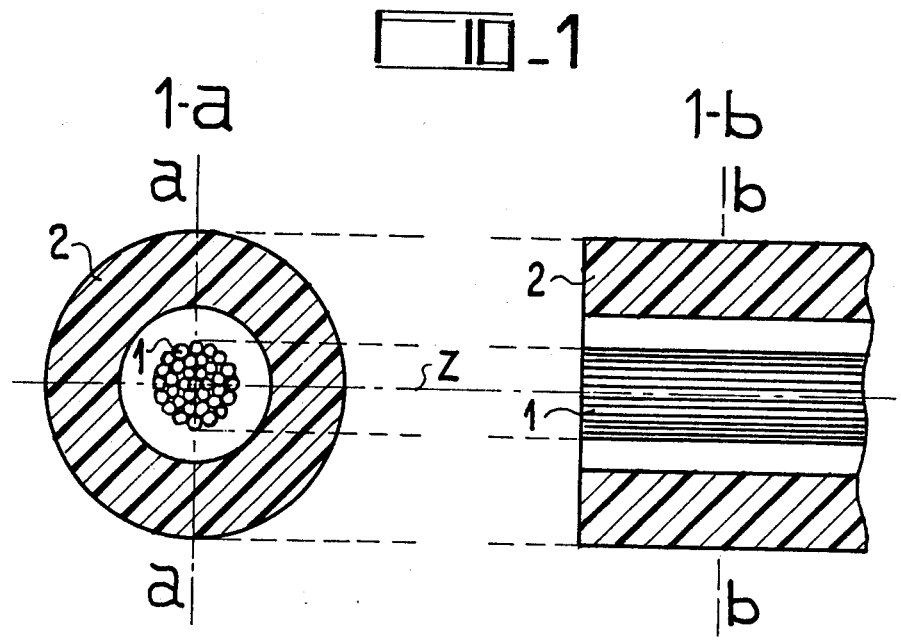
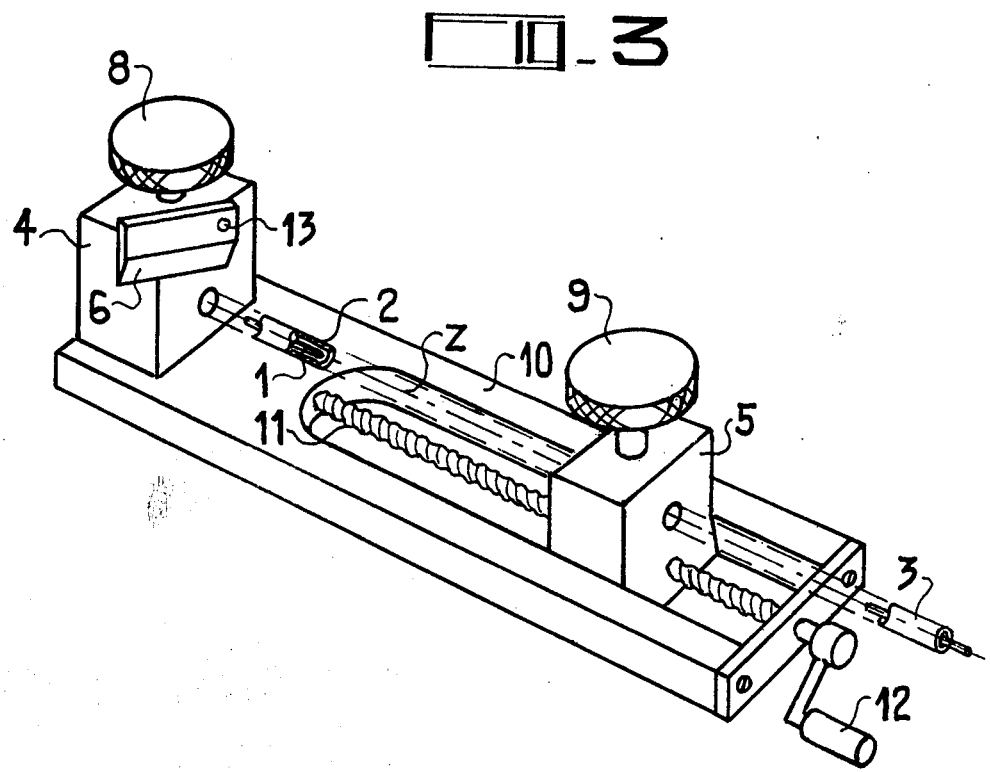

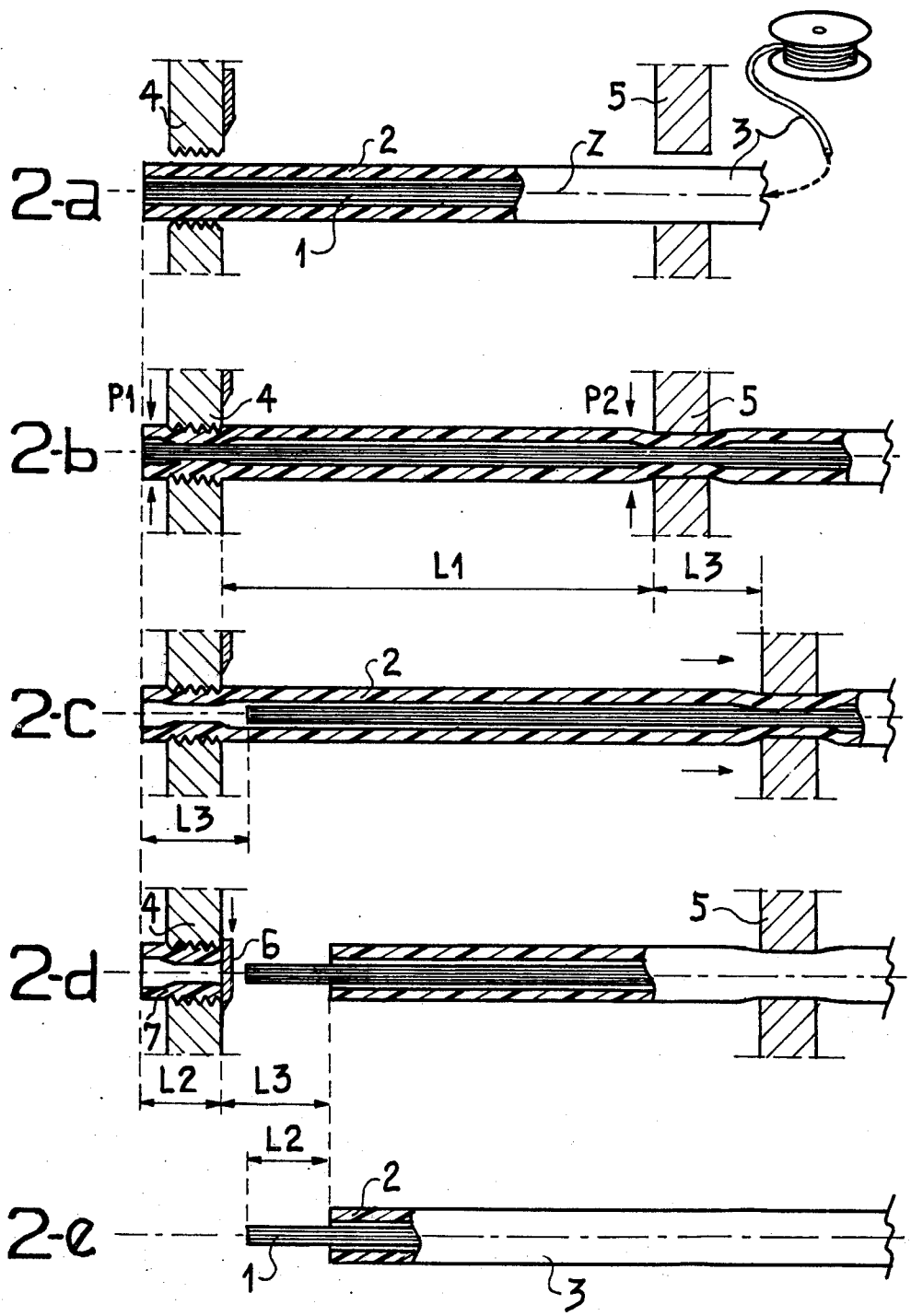

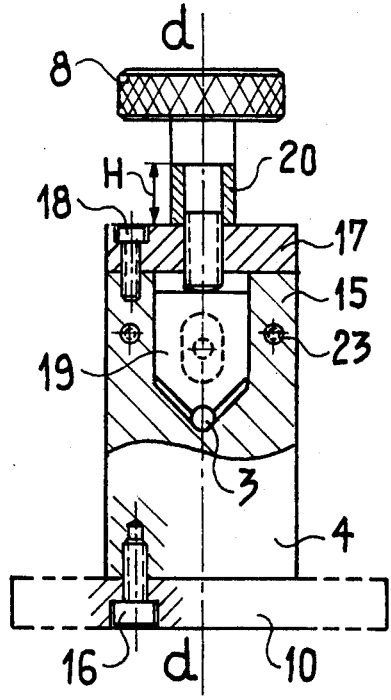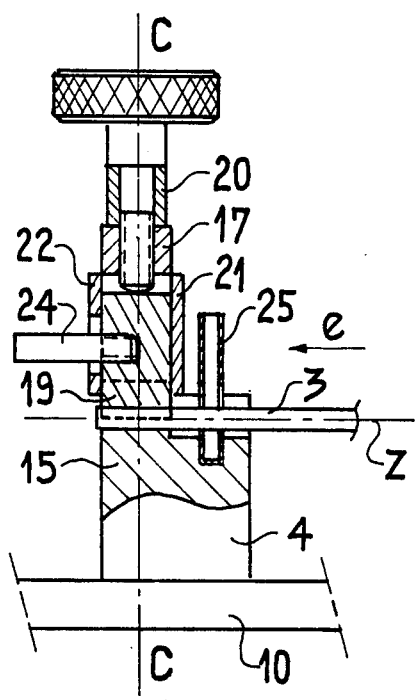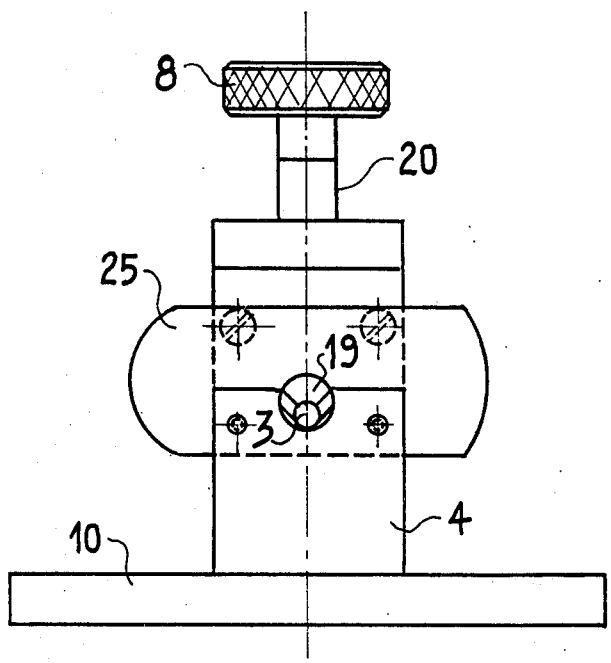

METHOD AND TOOL FOR STRIPPING ENDS OF CABLES CONTAINING MULTIPLE CONDUCTORS

The present invention relates to a method and tool for stripping ends of cables containing multiple conductors and, in particular, bundles of optical fibres.

The partial stripping of one end of a cable is generally carried out in order to expose the conductors, with the object of making a connection to a connector for example.

Stripping tools and apparatus are generally designed to operate on cables in which the conductors ae made of a metallic material and are in close contact with the external protective sheath, such as electrical cables having a single conductor or a divided conductor. The method employed with such tools or apparatus generally consists of clamping the cable near the end to be stripped, making a circular cut through the sheath at the required distance from the end and then ejecting the severed piece of sheath by sliding it longitudinally over the conductors.

A partial stripping operation carried out by removing a length of protective sheath which may be from a few millimeters up to one or even more centimeters is more difficult to perform when cables having divided conductors are involved than when stiff cables having a single conductor are involved. There is a risk that the severing operation which involves cutting into the sheath in a circle, may damage one or more of the conductors if the cut penetrates for too great a depth and in addition, during the final removal phase, conductors may be pulled out when there is a large number of them and their individual diameter is small.

In the particular context of bundles of optical fibres, the conductors are generally formed by fibres of glass and because of this are rather fragile. In addition, such cables, which are also termed optical wave-guides, often form a loose assembly, that is to say there is clearance between the protective sheath and the bundle of fibres, the diameter of the bundle being less than the inside diameter of the sheath so that the fibres retain a certain degree of mobility.

It follows that existing equipment is not well suited to the problem of stripping optical fibres since it is difficult to clamp the cable by exerting compression on it and then to make the cut without the risk of damaging the fibres in the bundle. This would be particularly disadvantageous in the case of connections made by optical fibres since it would result in transmission being attenuated as a result of losses of light energy.

One object of the invention is to provide a tool which enables the aforementioned drawbacks to be overcome and which enables the ends of optical fibres to be stripped without damage.

In accordance with a feature of the invention, the method of stripping which is employed consists of the following successive operations:

the cable is clamped by exerting compression on the sheath in two areas, namely a first area situated in the end-portion to be stripped and a second area situated outside this portion at a predetermined distance from the first area, the part of the sheath lying between the said areas is stretched by longitudinal traction by a predetermined amount at least equal to the axial length to be stripped, the said distance being calculated on the basis of the amount of stretch and the limiting elastic characteristics of the sheath material, a piece of sheath of the length to be stripped is cut off at the end of the cable, the cable is unclamped after the sheath has pulled back.

The invention will now be further described with reference to the accompanying drawing which show:

FIGS. 1a and 1b, a cross-section and a longitudinal section of a multi-conductor cable of the kind having a bundle of optical fibres, FIGS. 2a to 2e, the various stages of the method which is used in accordance with the invention, FIG. 3 a simplified diagram of an embodiment of stripping tool according to the invention, and FIGS. 4, 5 and 6, schematic details of the tool shown in FIG. 3.

The stripping method used is based on the property possessed by protective sheaths of returning to their initial positions after being stretched, provided that the limits within which the stretching takes place are compatible with the elastic characteristics of the sheath material. Protective sheaths are often made with a base of plastics materials, which possess this property to a greater or lesser degree as determined by their own elastic characteristics.

Bundles of optical fibres generally possess a sheath, made for example of polyvinyl chloride (PVC), which have the aforementioned property.

A stripping tool or apparatus is accordingly arranged to effect the following: to clamp a terminal portion of the cable at two mutually remote areas so that the sheath lying between these two areas can then be stretched by an adjustable amount and a piece of sheath of the intended stripped length can then be cut.

It is understood that the application to a bundle of optical fibres is not to be considered as limiting and that the invention can be more generally applied to cables whose characteristics as regards the elasticity of their sheaths and the way in which the sheaths are associated with one or more conductors permit the method to be employed without damage.

A bundle of optical fibres is shown schematically in FIGS. 1a and 1b, which show respectively a cross-section on bb and a partial longitudinal section on aa and which show the bundle of fibres proper at 1 and its protective sheath at 2, the bundle and the sheath forming a loose assembly.

In practice the bundle 1 often contains 19, 37 or 61 fibres whose individual diameter is between 60 and 80 microns, thus giving a bundle whose diameter is between 320 and 720 microns. In the case of such bundles, the outside diameter of the sheath 2 is of the order of 2mm while its inside diameter is approximately 1mm thus leaving an annular space to allow the fibres inside the sheath a certain freedom of movement.

The successive operations which are carried out to strip an end are illustrated in FIGS. 2a to 2e as follows:

The terminal part of the cable 3 at the end to be stripped is inserted in two gripping devices 4 and 5 (FIG. 2a), with the end to be stripped resting on a first gripping device 4, the second device 5 being situated at a distance from the device 4 downstream. The gripping devices preferably incorporate jaws which are circular in order substantially to follow the external contour of the cable.

The cable is clamped by compression from the first jaw 4 in a first area sitated where the portion to be stripped is located and by the action of the jaw 5 in a second area (FIG. 2b). The distance L1 between the two areas is adjustable by adjusting the relative positions of the jaws and is calculated beforehand on the basis of the nature of the material forming the sheath 2 and the intended length L2 to be stripped.

The portion of the sheath lying between the two clamping areas is stretched, the axial extend L3 of the stretch being calculated as a function of the length to be stripped. The stretching is brought about by moving one device relative to the other longitudinally (FIG. 2c).

A piece 7 of the sheath 2 of the desired length L2 is cut off by means of a cutting device or guillotine 6 (FIG. 2d). Immediately after the cutting operation the sheath 2 pulls back for a distance equal to the amount of stretch L3, thus exposing a length of the conductors of fibres 1 equal to the cut length L2.

The cable is unclamped after the sheath has pulled back, and a stripped cable is obtained (FIG. 2e).

The amount of stretch L3 must necessarily be at least equal to the stripped length L2. In practice the value of L3 is made greater than L2 so as to make allowance in particular for the space needed by the cutting device 6 and to prevent the latter coming into contact with the end of the fibres 1 whilst cutting and damaging them.

The interval L1 is made sufficiently large to permit a stretch of size L3 without the elastic limit being reached or exceeded and to safeguard against the risk of breakage under traction or of permanent distortion, which would tend to frustrate the desired result. The value of L1 is thus calculated on the basis of the sheath material and the length to be stripped.

As regards the pressures P1 and P2 which are exerted by the jaws 4 and 5 (FIG. 2b), these too are so predetermined that the requisite functions can be performed without damage to the fibres 1, that is to say so that the sheath alone is gripped and clamped by jaw 4 in the first area of front area and both the sheath and the conductors 1 are gripped and clamped in the second area or rear area. To this end pressure P1 is made higher than P2 and to ensure that the sheath 2 is more securely held in jaw 4 in the course of the stretching operation, this jaw preferably incorporates areas in relief and is preferably provided with ridges as shown. In the course of a grip being taken, (FIG. 2b) these areas in relief or ridges dig into the softer material of the sheath and thus help to hold the sheath immobile in the jaw 4 in the axial direction Z.

One possible embodiment of the stripping apparatus or tool is shown in simplified form in the diagram of FIG. 3, from which it can be seen to be formed by a front jaw 4 secured to a frame 10 and by a rear jaw 5 which can be moved parallel to the longitudinal axis Z of the cable by being slid and guided in a cutaway portion of the support 10. The jaws are made to grip by screws 8 and 9. Jaw 5 is moved by a suitable arrangement such as the combination of a screw 11 and a crank handle 12 which is shown.

The detailed FIGS. 4 to 6 provide a better understanding of the embodiment shown in FIG. 3. these FIGS. relate to only one of the jaws, namely the front jaw 4. The arrangement shown also applies to the rear jaw 5 though this jaw does not have the cutting device represented in FIG. 3 by a blade 6 which can be orientated about a shaft 13. FIGS. 4 and 5 include partial sections, respectively in a plane of section $cc$ transverse to the axis Z of the cable 3 when in its seating, and in a longitudinal plane of section $dd$. These sections show details of the gripping device 4, which has a lower part 15 which is secured to the frame by screws 16 and an upper part which forms a top 17. This member 17 is itself attached by screws 18 to the lower member 15 and it contains a threaded hole to receive a gripping screw 8 whose end bears against a part 19. Part 19 slides vertically in a cut out portion of the lower part 15 of device 4. Member 19 and 15 are machined so that they will come into close contact with the cylindrical sheath of the cable 3 and so as to form a circular jaw substantially matched to the outside diameter of the cable. A collar 20 restricts the travel of the screw 8, the height H of the collar being predetermined on the basis of the outside diameter of the cable 3 so as to provide a suitable clamping pressure P1. Plates 21 and 22 which are held in place against member 15 by screws 23 prevent the part 19 which forms the upper member of the jaw 4 being displaced axially. Plate 22 is partly-cut-away to allow a stud 24 to slide, this stud being used to raise member 19, in particular when the cable is being inserted.

The cutting device 6 may be formed simply by a blade which is guided in a support 25 forming a holder which includes a cut out portion to allow the cable 3 to pass through. For reasons of clarity the blade is not shown in FIGS. 5 and 6. It is understood that a more elaborate cutting device may be used.

A tool having the features of the invention may be applied with advantage to stripping bundles of optical fibres. It may be produced in such a way as to have the characteristics of small bulk and low weight thus allowing it to be easily moved about and to be used in workshops.

Of course, the invention is not limited to the embodiment described and shown which was given solely, by way of example.

What is claimed is:

1. A method of stripping ends of cables containing multiple conductors which have an external protective sheath surrounding the conductors, in particular bundles of optical fibres, the said method comprising the following successive operations:

clamping a cable by exerting compression on the sheath in two areas, namely a first area situated in the end-portion to be stripped and a second area situated outside this portion at a predetermined distance from the first area, stretching a part of the sheath lying between the said areas by longitudinal traction by a predetermined amount at least equal to the axial length to be stripped, the said distance being calculated on the basis of the amount of stretch and the limiting elastic characteristics of the sheath material, cutting off a piece of sheath of the length to be stripped at the end of the cable, the unclamping cable after the sheath has pulled back.

2. A tool for stripping ends of cables containing multiple conductors which have an external protective sheath surrounding the conductors, intended in particular for stripping optical fibre bundles, the said tool comprising: clamping means for clamping an end of the cable by exerting compression on the sheath, the said clamping means comprising a first gripping device to clamp the cable in a first area situated in the end-portion to be stripped, and of a second gripping device to clamp the cable in a second area situated outside the end portion to be stripped at a predetermined distance from the first area, stretching means which controls a linear movement of at least one of the said gripping devices so that the portion of sheath lying between the said areas is stretched by longitudinal traction by a predetermined amount at least equal to the axial length to be stripped, the said distance being calculated on the basis of the amount of stretch and the limiting elastic characteristics of the sheath material, and cutting means for cutting of a piece of sheath of the said stripped length at the end of the cable, said cutting means comprising a cutting device moved transversaly to said longitudinal stretching direction.

3. A tool according to claim 2, wherein the said cutting means comprises a guillotine mounted on the first gripping device.

4. A tool according to claim 3, wherein the stretching means consist of an actuating arrangement to move the second gripping device and of a mechanical support arranged to guide the said movement along a linear path and to support the said first gripping device.

5. A tool according to claim 4, wherein that the gripping devices comprise circular jaws and in that the jaw of the first gripping device contains ridges.

* * * * *